United States Patent Office 3,801,641
Patented Apr. 2, 1974

3,801,641
QUATERNARY AMMONIUM SALTS
Pierre H. Payot and Karl Gatzi, Basel, Switzerland, assignors to Ciba-Geigy Corporation, Ardsley, N.Y.
No Drawing. Filed May 29, 1967, Ser. No. 642,215
Int. Cl. C07c 87/30
U.S. Cl. 260—567.6 M          11 Claims

ABSTRACT OF THE DISCLOSURE

Quaternary ammonium salts in which three of the bonds of the quaternary ammonium nitrogen are occupied by aliphatic hydrocarbon radicals at least one of which has from 8 to 24 carbon atoms and the fourth bond is occupied by an aliphatic hydrocarbon radical of at most 6 carbon atoms which radical is substituted by a phenyloxy or phenylthio group the benzene nucleus of which is in turn substituted by an alkanoyl, carboxyl, alkoxycarbonyl, α-hydroxyalkyl or acylated α-hydroxyalkyl radical or by a functional radical which may be converted by hydrolysis to an alkanoyl group, such functional radicals being especially acetal, acylal or ketal groups; which quaternary ammonium salts are distinguished by antimicrobial properties, especially against phytopathogenic fungi, while being at the same time, surprisingly more generally tolerated by plants of diverse kinds, in contrast to known phenoxy- and phenylthioalkyl ammonium salts which are harmless only to certain selected plant varieties; a method of combatting microorganisms, and more especially for protecting plants against phytopathogenic fungi; compositions which contain the novel quaternary ammonium salts as active ingredients.

BACKGROUND OF THE INVENTION

Field of the invention

The invention relates to novel quaternary ammonium salts which have valuable microbicidal properties, microbicidal compositions which contain these ammonium salts as active ingredients, methods for combatting microorganisms, especially fungi and bacteria, with the aid of such quaternary ammonium salts or of agents containing these salts, as well as processes for the production of the new quaternary ammonium salts.

Description of the prior art

Quaternary tetra-alkyl ammonium salts are well-known as antimicrobially active ingredients in the protection of plants and material as well as in human medicine, but aralkyl- and aryloxy-alkyl-trialkyl ammonium salts have only become of importance in the protection of material and for medical disinfection. Because of their phytotoxicity and slight stability to weathering, these quaternary ammonium salts are not suitable for plant protection in general, but at best, for the protection of certain selected crops.

SUMMARY OF THE INVENTION

The invention provides quaternary ammonium salts of the general formula

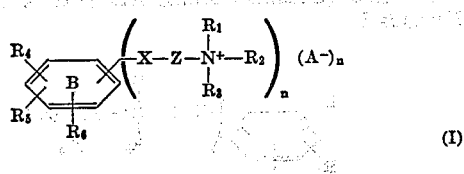

(I)

which have excellent microbicidal properties and are suitable, in particular, for the combatting of phytopathogenic fungi. These active substances are not phytotoxic but leave a wide variety of crops undamaged and are substantially stable to weathering conditions. They also have a good action on those fungi and bacteria which damage and destroy organic materials and articles of manufacture made therefrom.

In general Formula I, the symbols $R_1$, $R_2$ and $R_3$ each represent an unsubstituted or substituted aliphatic hydrocarbon radical, but at least one of these radicals has 8 to 24 and preferably 8 to 18 carbon atoms, while the remaining shorter ones are preferably lower alkyl or lower alkenyl radicals, $R_4$ represents an alkanoyl, carboxyl or alkoxycarbonyl radical, an α-hydroxyalkyl radical, an acylated α-hydroxyalkyl radical or a functional radical which by means of hydrolysis can be converted into an alkanoyl group, $R_5$ represents hydrogen or a halogen atom having an atomic number of at most 35, $R_6$ represents hydrogen, a halogen atom having an atomic number of at most 35, the nitro, amino, cyano or hydroxyl group, an unsubstituted or substituted aliphatic hydrocarbon radical, an unsubstituted or substituted aliphatic hydrocarbon radical bound to the benzene nucleus of which $R_6$ is a substituent by way of oxygen or sulphur, an alkylamino, dialkylamino or acylamino group, or $R_5$ and $R_6$ together with the benzene nucleus bearing them represent a naphthyl radical, X represents oxygen or sulphur, Z represents a divalent aliphatic hydrocarbon radical having from 1 to 6 carbon atoms, and, when Z has 2 to 6 carbon atoms, preferably at least two thereof are in direct chain between X and N, A represents the anion of an organic or inorganic acid, and n represents the number 1 or 2.

DETAILED DESCRIPTION OF THE INVENTION AND PREFERRED EMBODIMENT THEREOF

The hydrocarbon radicals $R_1$, $R_2$ and $R_3$ in Formula I are straight or branched chain alkyl or alkenyl radicals. These radicals can be substituted, e.g. by halogen, the hydroxyl, mercapto, amino or cyano group and/or alkoxy, alkylthio, alkylamino or dialkylamino group.

Preferably all aliphatic groups in this and the following definitions of the substituents occurring in Formula I are of low molecular weight, having at most about 5 carbon atoms unless expressly stated otherwise.

Alkanoyl groups $R_4$ are, in particular, the formyl, acetyl, propionyl or butyryl radical. $R_4$ as a functional radical which can be converted into an alkanoyl group by means of hydrolysis, represents an acetal, acylal or ketal radical. The term "acetal radical" comprises monomeric and polymeric acetal as well as hemiacetal radicals. Acylal radicals represented by $R_4$ are particularly those of the formula

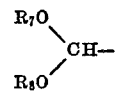

wherein $R_7$ and $R_8$ represent fatty acid radicals, preferably lower alkanoyl radicals of at most 5 carbon atoms each.

When $R_4$ is an unacylated or acylated α-hydroxyalkyl radical, the "alkyl" moiety has preferably not more than 5 carbon atoms; acylated α-hydroxyalkyl radicals are preferably those α-hydroxy-lower alkyl radicals which are esterified with a fatty acid of up to 20 carbon atoms, lower fatty acid being preferred.

When $R_6$ represents an aliphatic hydrocarbon radical, the latter is, in preferred compounds of Formula I, an alkyl or alkenyl radical of at most 5 carbon atoms. Such radical can be substituted by halogen, especially by fluorine, chlorine or bromide. When $R_6$ represents alkylamino or dialkylamino radicals the alkyl groups therein have, preferably, not more than 4 carbon atoms. When $R_6$ represents acylamino, such group is preferably a lower alkanoylamino group.

In preferred compounds of Formula I, Z represents an alkylene chain of from 1 to 6 carbon atoms or an alkenylene chain of from 2 to 6, but preferably from 3 to 4 carbon atoms.

The symbol A stands for an anion of an inorganic or organic acid, for example, the anions of the following acids: hydrohalic acids, sulphuric acid, phosphoric acid, perchloric acid, alkyl sulphuric acids, naphthoic acids, benzoic acid, acetic acid, aminoacetic acid, butyric acid, stearic acid, oxalic acid, adipic acid, maleic acid, tartaric acid, lactic acid, etc.

Because of their excellent action on numerous phytopathogenic fungi, those quaternary ammonium salts falling under Formula I, in which $R_1$ represents alkyl of from 8 to 18 carbon atoms, each of $R_2$ and $R_3$ represents lower alkyl,
$R_4$ represents lower alkanoyl, carboxy, α-hydroxy-lower alkyl, α-alkanoyloxy-lower alkyl wherein the alkanoyloxy moiety has from 2 to 5 carbon atoms, lower alkoxycarbonyl, acetal of at most 9 carbon atoms, ketal of at most 10 carbon atoms, or alkanoylal of at most 9 carbon atoms, the latter three radicals preferably having at most 5, 6 or 5 carbon atoms, respectively,
$R_5$ represents hydrogen or a halogen atom of an atomic number of at most 35, especially chlorine or bromine,
$R_6$ represents hydrogen, halogen of an atomic number of at most 35, nitro, amino, cyano, lower alkyl, lower alkoxy, lower alkylthio, alkenyl of from 2 to 4 carbon atoms, alkenyloxy of from 3 to 4 carbon atoms, alkenylthio of from 3 to 4 carbon atoms, lower alkylamino, di-(lower alkyl)-amino or lower alkanoylamino,
or $R_5$ and $R_6$ taken together with the benzene nucleus B represent a napthyl radical,
and X, Z, A and n have the same meanings as in Formula I, are preferred.

Particularly accessible among these preferred compounds of the invention are those in which $R_4$ represents a lower alkanoyl group or one of those above-mentioned groups which can be converted into a lower alkanoyl group by hydrolysis.

Most preferred quaternary ammonium salts are those compounds of General Formula I wherein $R_4$ represents a formyl group in an o-position to the bridging member X and each of $R_5$ and $R_6$ represents a halogen atom.

The quaternary ammonium salts of General Formula I wherein $R_4$ is the formyl radical, an acetal or acylal radical, are effective, for example, against the following fungi which cause plant diseases:

*Phytophthora infestans*  *Uromyces oppendiculatus*
*Alternaria solani*       *Venturia inaequalis*
*Botrytis cinerea*

The activity against fungi which are known to cause powdery mildew such as, e.g. types of the Erysiphe family, is of great importance. It is possible by the application of these active substances to combat or inhibit non-mildew fungi and mildew infections occurring on the same host plants. The new agents can be used for the protection of plants and parts thereof (blossoms, seeds, fruits, foilage, stems) from attack by fungi. As seed dressings, the new agents give good protection to the seeds treated without germination being inhibited. These salts also have varying bactericidal activity but their main value lies in their great fungicidal activity. The fungicidal activity of the quaternary ammonium salts usable according to the invention is tested on:

(1) *Botrytisp cinerea* on beans (*Vicia faba*), and
(2) *Alternaria solani* on tomatoes.

In these tests, N-phenoxyethyl-N-dodecyl-N,N-dimethyl ammonium bromide, which is known from the Belgian Pat. No. 631,160, was used as a comparative substance. Whilst none of the salts according to the invention injured the treated plants, the know compound caused strong burnings which made it impossible to evaluate the growth of fungi.

*Botrytis cinerea* on beans (*Vicia faba*)

Three freshly cut bean leaves (*Vicia faba*) are placed with the upper surface downwards on moist filter paper in Petri dishes. The leaves are then sprayed with a 0.1% aqueous suspension of active substance. After drying the spray coating, the leaves are infected with a fresh suspension of the spores of *Botrytis cinerea*. The dishes are covered and left to stand for 1–2 days at room temperature. The test is evaluated as follows: 10=total infestition; 9–1=extent of infestation; 0=no growth of fungi. The control plants which had been infected with the spore suspension but not treated with an active substance, showed complete infestation and were evaluated at 10.

| Active substance: | Infestation of the leaves |
|---|---|
| N-(2-formyl-4,6-dichlorophenoxyethyl)-N-decyl-N,N-dimethyl ammonium bromide | 0 |
| N-(2-formyl-4,6-dichlorophenoxyethyl)-N-dodecyl-N,N-dimethyl ammonium bromide | 0 |
| N-(2-formyl-4,6-dichlorophenoxyethyl)-N-octyl-N,N-dimethyl ammonium bromide | 0 |
| N-(2-formyl-4,6-dichlorophenoxyethyl)-N-decyl-N,N-dimethyl ammonium bromide | 0 |
| N-(2-formyl-4-chloro-6-bromophenoxyethyl)-N-dodecyl-N,N-dimethyl ammonium bromide | 0 |
| N-(2-formyl-4,6-dibromophenoxyethyl)-N-dodecyl-N,N-dimethyl ammonium bromide | 0 |

*Alternaria solani* on tomatoes

The leaves of 3 to 4 week old tomato plants (roter Gnom) are sprayed with an aqueous 0.1% suspension of active substance. After drying the spray coating, the leaves are infected with a fresh suspension of spores of *Alternaria solani* and the plants are placed for 5–6 days in a greenhouse at about 20° and 95–100% air humidity. The tests were evaluated as follows: 10=total infestation; 9–1=extent of infestation; 0=no growth of fungi.

The control plants showed total infestation and were given the value 10.

| Compound: | Infestation of the leaves |
|---|---|
| N-(2-formyl-4,6-ichlorophenovyethyl)-N,N-dimethyl-N-dodecyl ammonium bromide | 1 |
| N-(2-formyl-4-chloro-6-bromophenoxyethyl)-N,N-dimethyl-N-dodecyl ammonium bromide | 3 |
| N-(4-formylphenoxyethyl)-N,N-dimethyl-N-decyl ammonium bromide | 5 |
| N-(2-formyl-4,6-dichlorophenoxyethyl)-N,N-dimethyl-N-octyl ammonium bromide | 5 |

The new quaternary ammonium salts of the General Formula I

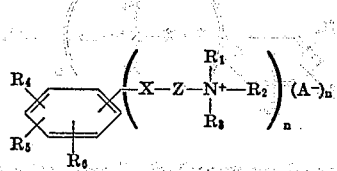

(I)

wherein $R_1$, $R_2$, $R_3$, $R_4$, $R_5$, $R_6$, X, Z, A and n have the meanings given above are obtained by quaternizing a tertiary amine of the general formula

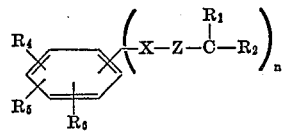
(II)

wherein $R_1$, $R_2$, $R_4$, $R_5$, $R_6$, X, Z and $n$ have the meanings given above, with a compound of the general formula $$(R_3—A')_n \qquad (III)$$

wherein $R_3$ represents an unsubstituted or substituted aliphatic hydrocarbon radical, A' represents a halogen atom, an alkoxysulphonyloxy or arylsulphonyloxy group, and $n$ represents the number 1 or 2, and if desired, reacting the quaternary salts so obtained with other non-phytotoxic, inorganic or organic acids in order to exchange the anion. It is of advantage to perform the quaternarization in the presence of a solvent or diluent which is inert to the reaction partners such as an aromatic hydrocarbon, e.g. benzene, toluene or xylenes, a chlorinated aromatic hydrocarbon, e.g. chlorobenzene, an N-alkylated acid amids such as dimethyl formamide, nitriles, an ether and such like. The reaction temperatures lie between 50 and 150° C. The reaction times are between 15 minutes and 24 hours and depend considerably on the reactivity of the reaction partners and the solvent used.

Alkyl halides, dialkyl sulphates, toluene sulphonic acid esters etc. are used as quaternising agents of General Formula III; the alkyl halides are preferred. The halogen ion of the quaternary ammonium halides obtained can easily be exchanged for the anion of any non-phytotoxic inorganic or organic acid desired, i.e.

(a) by conversion of the halide into the hydroxide and subsequently neutralization with the corresponding acid, and (b) by treatment with the halide or hydroxide with a synthetic resin anion exchanger.

Quaternary ammonium salts of the General Formula I are obtained by another process if a secondary amine of the general formula

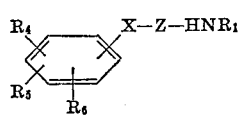
(IV)

wherein $R_1$, $R_4$, $R_5$, $R_6$, X and Z have the meanings given in Formula I, is reacted at a temperature between 80 and 110° C. with formic acid and formaldehyde and then the reaction product is quaternized with a compound of General Formula III.

Quaternary ammonium salts of General Formula I are also obtained if a compound of general formula

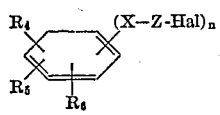
(V)

wherein

Hal represents a halogen atom having an atomic weight lower than 100, and $R_4$, $R_5$, $R_6$, X, Z and $n$ have the meanings given in Formula I, is reacted at a temperature between 90 and 110° C., optionally in the presence of a solvent or diluent, with equivalent amounts of a tertiary amine of the general formula

(VI)

wherein $R_1$, $R_2$ and $R_3$ have the meanings given in Formula I.

In addition, quaternary ammonium salts of General Formula I can also be produced when a benzene of the general formula

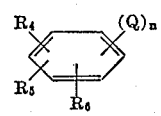
(VII)

is reacted with equivalent amounts of a quaternary ammonium salt of the general formula

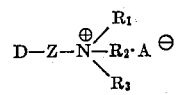
(VIII)

in which formulae

Q and D are radicals which are split off in the reaction, with the exception of an O or S atom present in one of them, and $R_1$, $R_2$, $R_3$, $R_4$, $R_5$, $R_6$, Z, A and $n$ have the meanings given in Formula I.

In the General Formulae VII and VIII, one of the symbols Q and D can be, e.g. the hydroxyl or mercapto groups and the other a halogen atom or one can be the group O— or S—Me wherein Me is a metal atom, and the other a halogen atom. The reaction is performed advantageously at a temperature between 110 and 150° C. and in the presence of both a solvent or diluent inert to the reaction partners and an acid binding agent.

Quaternary ammonium salts of General Formula I wherein $R_4$ is an alkanoyl radical containing at least 2 carbon atoms are also obtained when a quaternary ammonium salt of general formula

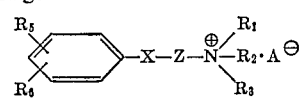
(IX)

wherein $R_1$, $R_2$, $R_3$, $R_5$, $R_6$, X, Z and A have the meanings given in Formula I is reacted according to Friedel-Crafts or a related reaction with a halide or anhydride of an aliphatic carboxylic acid containing at least 2 carbon atoms. The reaction is performed in the presence of a Lewis acid and optionally in the presence of a solvent or diluent which is inert to the reaction components.

Examples of Lewis acids which can be used in this process are: aluminium chloride, antimony pentachloride, iron trichloride, tellurium chloride, tin chloride, titanium tetrachloride, bismuth chloride, zinc chloride, as well as the corresponding bromides and iodides, also boron trifluoride, boron trichloride hydrogen fluoride, sulphuric acid, phosphorus pentoxide, polyphosphoric acids etc. An amount of 1–5 mol of the Lewis acid is generally added to the reaction mixture. The reaction temperatures with the Lewis acid lie between 40 and 200° C.

Quaternary ammonium salts of General Formula I wherein $R_4$ is the formyl radical or the acetal radical which can be converted into the formyl radical by hydrolysis, can be obtained by another process by reacting a phenyl magnesium bromide compound of the general formula

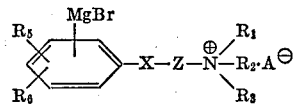
(X)

wherein $R_1$, $R_2$, $R_3$, $R_5$, $R_6$, X, Z and A have the meanings given in Formula I, with an orthoformic acid ester and optionally hydrolysing the acetal derivative obtained to the formyl compound.

Quaternary ammonium salts of the General Formula I wherein $R_4$ represents a hydroxymethyl radical can also be prepared from the corresponding chloromethyl compounds obtained from the reaction with formaldehyde and hydrogenchloride in the presence of a catalyst.

The following non-limitative examples illustrate the production of the new active substances of General Formula I further. Where not expressly stated otherwise, parts and percentages are given by weight, and the temperatures are in degrees centigrade.

EXAMPLE 1

543 parts of N-(2-formyl - 4,6 - dichlorophenoxyethyl)-N,N-dimethylamine and 748 parts of dodecyl bromide are heated for 5 hours at 100° while stirring. The thick reaction mass formed is then loosened up and dissolved in hot benzene. The undissolved part is filtered off and the filtrate is cooled, whereupon N-(2-formyl - 4,6 - dichlorophenoxyethyl) - N,N - dimethyl - N - dodecyl ammonium bromide precipitates. After drying, the compound melts at 120–122°.

EXAMPLE 2

A solution of 2.43 parts of 2-bromoethoxy-acetophenone in 7.0 parts of a 33% by volume ethanolic dimethylamine solution is heated in an autoclave for 6 hours at 80°. The reaction mixture obtained is evaporated and the residue is dissolved in excess 2 N hydrochloric acid. Non-basic side products are taken up in ether. After adding excess 2 N sodium hydroxide, an oil separates which is extracted with ether. The ethereal solution is washed twice with water, dried over sodium sulphate, filtered and the filtrate is concentrated. The oil which remains is heated with 1.8 parts of dodecyl bromide on a boiling water bath for 4 hours. After cooling, the oily mass obtained is thoroughly washed with ethyl ether and the precipitated crystals are filtered off and recrystallised from acetone/ethyl ether. The N - (2 - acetyl - phenoxyethyl) - N,N - dimethyl - N - dodecyl ammonium bromide obtained melts at 86–89°.

EXAMPLE 3

On using equivalent amounts of 4 - β - bromoethoxybenzaldehyde and ethanolic dimethylamine solution, N-(4 - formyl-phenoxyethyl) - N,N - dimethyl - N - dodecyl ammonium bromide, M.P. 75–78°, is obtained by the method described in Example 2.

EXAMPLE 4

2.43 parts of 2-bromoethoxy-acetophenone, 1.99 parts of N-methyl-N-n-dodecylamine and 4 parts by volume of 96% ethyl alcohol are heated in a bomb tube for 16 hours at 160°. The solvent is then distilled off under vacuum, the residue is dissolved in excess 2 N hydrochloric acid and non-basic side-products are removed by extracting twice with ether. The aqueous solution is then made alkaline to mimosa paper with 2 N NaOH, the base is taken up by shaking in ether, dried with magnesium sulphate and the ether is distilled off in vacuo. The oily residue is reacted with 3 parts by volume of methyl bromide whereupon the oily substance obtained is purified on a column of silica gel. The N-(2-acetyl-phenoxyethyl)-N,N-dimethyl-N-dodecyl ammonium bromide obtained melts at 87–88°.

EXAMPLE 5

On using equivalent amounts of 4 - β - bromoethoxybenzaldehyde, N - methyl - N - octadecylamine and methyl bromide, N-(4-formylphenoxyethyl) - N,N - dimethyl-N-octadecyl ammonium bromide is obtained as an oil by the process described in Example 4.

EXAMPLE 6

9.3 parts of 4-chloro-3-nitrobenzaldehyde are dissolved in 70 parts by volume of 96% ethanol. 2-dimethylamino-ethane thiol is added to the reaction mixture within 2 hours at 40–50° while vigorously stirring, 70 parts by volume of 1 N NaOH being simultaneously added dropwise so that the pH of the mixture is maintained at 9–10. On completion of the reaction, the whole is refluxed for 4 hours whereupon the ethanol is distilled off. The residue is dissolved in 1 N hydrochloric acid and the acid solution is extracted with ether to remove non-basic side-products. The base is liberated from the acid solution by neutralizing it with ammonia. The base is taken up in ether and the combined ether solutions are dried with sodium sulphate and concentrated. The residue is recrystallized from ethyl acetate, M.P. 68–69°.

8.7 parts of 3-nitro-4-(β-dimethylaminoethylthio)-benzaldehyde and 9.0 parts of dodecyl bromide are reacted for 4 hours at 100°. N-(2-nitro-4-formyl-phenylthioethyl)-N,N-dimethyl-N-dodecyl ammonium bromide is obtained as a resinous oil. This is purified by dissolving in acetone and separated with ether.

EXAMPLE 7

1.58 parts of o-hydroxyacetophenone sodium salt, 4.01 parts of α-bromo-β-(dimethyl-n-dodecylamino)-ethyl bromide and 50 parts by volume of 96% ethyl alcohol are refluxed for 10 hours while stirring well. The ethyl alcohol is then completely evaporated off in a rotary evaporator. The residue is stirred into 70 parts by volume of boiling ethyl acetate and filtered to remove salts. The clear solution is evaporated and the sticky residue is recrystallized from acetone/ether. N-(2-acetyl-phenoxyethyl)-N,N-dimethyl-N-dodecyl ammonium bromide is obtained, M.P. 91–92°.

EXAMPLE 8

2.43 parts of 2-β-bromoethoxy-acetophenone and 2.13 parts of dodecyl-dimethylamine are heated for 20 hours on a boiling water bath. After cooling, the oily mass formed is thoroughly washed with ethyl ether. The precipitated crystals are filtered off, washed with ethyl ether and dried. After recrystallizing twice from acetone/ether, the N-(2-acetyl-phenoxyethyl)-N,N-dimethyl - N - dodecyl ammonium bromide obtained melts at 91–92°.

EXAMPLE 9

4.14 parts of N-β-phenoxyethyl-N,N-dimethyl-N-dodecyl ammonium bromide are dissolved in 75 parts by volume of carbon disulphide and 2 parts by volume of acetic acid anhydride. At 46°, 3.5 parts of aluminium chloride are added within 15 minutes to the vigorously stirred, boiling reaction mixture whereupon strong hydrogen chloride development occurs. Strong gas development ceases after 90 minutes whereupon the cooled mixture is poured into ice and water, the carbon disulphide is distilled off under reduced pressure and the aqueous solution which remains is extracted three times with 50 parts by volume of chloroform each time. After drying the chloroform solution with a little calcium chloride, the chloroform is evaporated. The crude product is purified on a silica gel column. N-(4-acetyl-phenoxyethyl)-N,N-dimethyl - N - dodecyl ammonium bromide is obtained, M.P. 78–81°.

EXAMPLE 10

5.1 parts of N-(2-formyl-4,6-dichlorophenoxyethyl)-N,N-dimethyl-N-dodecyl ammonium bromide are dissolved in 70 parts by volume of 96% ethanol and, after the addition of 1.5 parts of mercury chloride, the whole is stirred vigorously for 25 hours at 20°. The precipitate formed is then filtered off under suction and the filtrate is evaporated to dryness. The oil which remains is purified by dissolving in acetone and separated with anhydrous ether. The N-(2-formyl-4,6-dichlorophenoxyethyl)-N,N-dimethyl-N-dodecyl ammonium chloride obtained melts at 75°.

EXAMPLE 11

4.1 parts of N-(2-formyl-4,6-dichlorophenoxyethyl)-N,N - dimethyl - N - dodecyl ammonium bromide are dissolved in 50 parts by volume of warm water. 5 parts by volume of concentrated sulphuric acid are carefully added at 70–80° and the reaction mixture is left to stand for 15 minutes. It is then cooled, whereupon the oil which has separated is taken up by extraction in chloroform. The chloroform solution is then dried over calcium chloride and the chloroform is distilled off under vacuum. The residue is recrystallized from acetone. The N-(2-formyl-4,6-dichlorophenoxyethyl)-N,N-dimethyl-N-dodecyl ammonium hydrosulphate obtained melts at 110°.

EXAMPLE 12

(a) A mixture of 5 g. of 2-[β-(dimethyl-n-dodecylammonio)ethoxy]-4,6-dichloro-benzaldehydebromide, 75 ml. of acetic acid anhydride and 1 drop of concentrated sulphuric acid was stirred for four days at room temperature. The solution was evaporated in vacuo and the acylal isolated by extraction with ether and then crystallized from acetone/ether. The yield is 1.5 g. equal to 2.5% of the theoretical yield. The final product has the formula

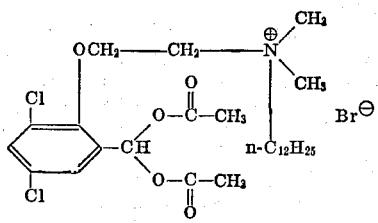

and its melting point is 112–113°.

50 mg. of 2-[β-(dimethyl-n-dodecylamonio)-ethoxy]-4,6-dichloro-benzaldehydediacetate-bromide, obtained as described above, are suspended in 2 ml. of 2 N hydrochloric acid. The suspension is stirred vigorously and heated to 90° for 30 minutes on a steam bath. After cooling to 25° the hydrolysis mixture is extracted 3 times with 5 ml. of chloroform. The combined extracts are then washed twice with 1 N sodium bicarbonate solution and then once with water. The chloroform solution is evaporated under reduced pressure and the resulting oil is washed with dry ether. The free aldehyde at once precipitates as a nearly white granular solid. It is dried under reduced pressure and is identical with the final product of Example 1.

(b) By repeating Example 12(a), but using in lieu of 75 ml. of acetic acid anhydride, 76 ml. of ethylene glycol, in lieu of one drop of sulfinic acid one drop of concentrated aqueous hydrobromic acid (48%), and otherwise repeating the procedure of the said example, but in lieu of stirring for four days at room temperature, the mixture is heated for 10 hours at 90° on a steam bath, there is obtained the compound of the formula

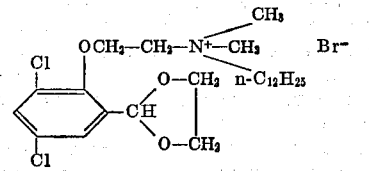

as an oil.

(c) By repeating Example 12(b) but using in lieu of 76 ml. of ethylene glycol, 100 ml. of triethyl orthoformate there is obtained the compound of the formula

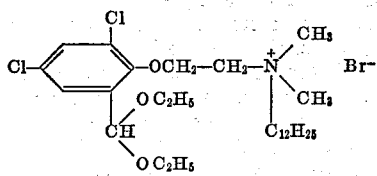

as an oil.

(d) By repeating Example 12(c) but using in lieu of the starting benzaldehyde bromide an identical amount of N-(2-acetyl-4-cyano-phenoxyethyl) - N,N - dimethyl - N-dodecyl ammonium bromide, there is obtained the ketal of the formula

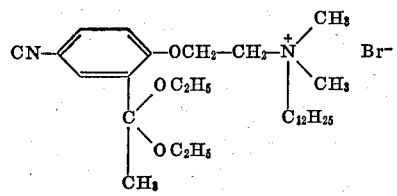

as an oil.

The compounds listed in the following are produced by repeating the procedure of Example 1, but using in lieu of the reactants employed therein equivalent amounts of the corresponding suitably substituted starting amines and higher alkyl halides or nitrates.

| Ex. No. | Compounds | M.P. (deg.) |
|---|---|---|
| 13 | N-(2-formyl-phenoxyethyl)-N,N-dimethyl-N-dodecyl ammonium bromide. | 104–110 |
| 14 | N-(2-formyl-4-chlorophenoxyethyl)-N,N-dimethyl-N-dodecyl ammonium bromide. | 123–124 |
| 15 | N-(2-formyl-4-bromophenoxyethyl)-N,N-dimethyl-N-dodecyl ammonium bromide. | 119–120 |
| 16 | N-(2-formyl-4-methyl-phenoxyethyl)-N,N-dimethyl-N-dodecyl ammonium bromide. | 65 |
| 17 | N-(2-formyl-4-methyl-phenoxyethyl)-N,N-dimethyl-N-octadecyl ammonium bromide. | 104 |
| 18 | N-(2-formyl-4-nitro-phenoxyethyl)-N,N-dimethyl-N-dodecyl ammonium bromide. | 132–135 |
| 19 | N-(2-formyl-6-methoxy-phenoxyethyl)-N,N-dimethyl-N-dodecyl ammonium bromide. | 87–88 |
| 20 | N-(2-formyl-6-methoxy-phenoxyethyl)-N,N-dimethyl-N-octadecyl ammonium bromide. | 98–100 |
| 21 | N-(2-formyl-4,6-dichlorophenoxyethyl)-N,N-dimethyl-N-octyl ammonium bromide. | 135–136 |
| 22 | N-(2-formyl-4,6-dichlorophenoxyethyl)-N,N-dimethyl-N-decyl ammonium bromide. | 120–126 |
| 23 | N-(2-formyl-4,6-dichlorophenoxyethyl)-N,N-dimethyl-N-dodecyl ammonium nitrate. | 85–87 |
| 24 | N-(2-formyl-4,6-dichlorophenoxyethyl)-N,N-dimethyl-N-dodecyl ammonium bromide. | >70 |
| 25 | N-(2-formyl-4,6-dichlorophenoxyethyl)-N,N-dimethyl-N-octadecyl ammonium bromide. | 65–69 |
| 26 | N-(2-formyl-4,6-dibromophenoxyethyl)-N,N-dimethyl-N-dodecyl ammonium bromide. | 115–117 |
| 27 | N-(2-formyl-4-chloro-6-bromophenoxyethyl))-N,N-dimethyl-N-dodecyl ammonium bromide. | 121–125 |
| 28 | N-(2-formyl-6-allyl-phenoxyethyl)-N,N-dimethyl-N-dodecyl ammonium bromide. | 138–140 |
| 29 | N-(2-formyl-4-methylthio-phenoxyethyl)-N,N-dimethyl-N-dodecyl ammonium bromide. | 73–75 |
| 30 | N-(2-formyl-4,6-dichlorophenoxypropyl)-N,N-dimethyl-N-dodecyl ammonium bromide hydrate. | 75 |
| 31 | N-(3-formyl-phenoxyethyl)-N,N-dimethyl-N-dodecyl ammonium bromide. | 85–87 |
| 32 | N-(4-formyl-phenoxyethyl)-N,N-dimethyl-N-dodecyl ammonium bromide. | 76–79 |
| 33 | N-(4-formyl-6-methoxy-phenoxyethyl)-N,N-dimethyl-N-dodecyl ammonium bromide. | 65 |
| 34 | N-(4-formyl-6-methoxy-phenoxypropyl)-N,N-dimethyl-N-octadecyl ammonium bromide. | 88–90 |
| 35 | N-(2-chloro-4-formyl-6-methoxy-phenoxyethyl)-N,N-dimethyl-N-decyl ammonium bromide. | Oil |
| 36 | N-(2-chloro-4-formyl-6-methoxy-phenoxyethyl)-N,N-dimethyl-N-dodecyl ammonium bromide. | Oil |
| 37 | N-(2-bromo-4-formyl-6-methoxy-phenoxyethyl)-N,N-dimethyl-N-dodecyl ammonium bromide. | 87–90 |
| 38 | N-(2-bromo-4-formyl-6-methoxy-phenoxyethyl)-N,N-dimethyl-N-octadecyl ammonium bromide hydrate. | 66–70 |
| 39 | N-(4-formyl-phenylthioethyl)-N,N-dimethyl-N-dodecyl ammonium bromide. | 121–123 |
| 40 | N-(2-nitro-4-formyl-phenylthioethyl)-N,N-dimethyl-N-dodecyl ammonium bromide. | Waxy |
| 41 | N-(2-methoxy-4-formyl-phenoxypropyl)-N,N-dimethyl-N-octyl ammonium bromide hydrate. | 67–72 |
| 42 | N-(2-acetyl-phenoxyethyl)-N,N-dimethyl-N-octyl ammonium bromide. | 84–86 |
| 43 | N-(2-acetyl-phenoxyethyl)-N,N-dimethyl-N-dodecyl ammonium bromide. | 90–91 |
| 44 | N-(2-acetyl-4-chlorophenoxyethyl)-N,N-dimethyl-N-dodecyl ammonium bromide. | 94–96 |
| 45 | N-(2-acetyl-4-methyl-phenoxyethyl)-N,N-dimethyl-N-dodecyl ammonium bromide. | 91–93 |
| 46 | N-(2-acetyl-5-methoxy-phenoxyethyl)-N,N-dimethyl-N-octyl ammonium bromide. | 101–102 |
| 47 | N-(2-acetyl-5-methoxy-phenoxyethyl)-N,N-dimethyl-N-dodecyl ammonium bromide. | 70–71 |
| 48 | N-(1-formyl-4-diethylamino-phenoxyethyl)-N,N-dimethyl-N-dodecyl ammonium bromide. | --------- |
| 49 | N-(2-formyl-4-chloro-6-acetylamino-phenoxyethyl)-N,N-dimethyl-N-dodecyl ammonium bromide. | --------- |
| 50 | N-(2-formyl-4-diethylamino-phenoxyethyl)-N,N-dimethyl-N-dodecyl ammonium iodide. | 182–184 |
| 51 | N-(2-acetyl-4-cyano-phenoxyeth l)-N,N-dimeth l-N-dodecyl ammonium bromide. | 93–95 |

TABLE—Continued

| Ex. No. | Compounds | M.P. (deg.) |
|---|---|---|
| 52 | N-(2-acetyl-4-amino-phenoxyethyl)-N,N-dimethyl-N-dodecyl ammonium bromide. | |
| 53 | N-(2-acetyl-4-methylamino-phenoxyethyl)-N,N-dimethyl-N-dodecyl ammonium bromide. | |
| 54 | N-(2-acetyl-4,6-dichlorophenoxyethyl)-N,N-dimethyl-N-decyl ammonium bromide hydrate. | Waxy |
| 55 | N-(2-acetyl-4,6-dichlorophenoxyethyl)-N,N-dimethyl-N-dodecyl ammonium bromide. | 92–94 |
| 56 | N-(2-acetyl-4,6-dibromophenoxyethyl)-N,N-dimethyl-N-dodecyl ammonium bromide. | 105–106 |
| 57 | N-(2-acetyl-4-chloro-5-methyl-phenoxyethyl)-N,N-dimethyl-N-octyl ammonium bromide hydrate. | 61–62 |
| 58 | N-(2-acetyl-4-chloro-5-methyl-phenoxyethyl)-N,N-dimethyl-N-dodecyl ammonium bromide. | 75–77 |
| 59 | N-(4-acetyl-phenoxyethyl)-N,N-dimethyl-N-octyl ammonium bromide. | 109–111 |
| 60 | N-(4-acetyl-phenoxyethyl)-N,N-dimethyl-N-dodecyl ammonium bromide. | 76–78 |
| 61 | N-(4-acetyl-6-methoxy-phenoxyethyl)-N,N-dimethyl-N-dodecyl ammonium bromide. | 88–90 |
| 62 | N-(2-acetyl-phenoxypropyl)-N,N-dimethyl-N-decyl ammonium bromide. | 113–114 |
| 63 | N-(2-acetyl-phenoxypropyl)-N,N-dimethyl-N-dodecyl ammonium bromide. | 95–97 |
| 64 | N-(2-propionyl-phenoxyethyl)-N,N-dimethyl-N-octyl ammonium bromide. | 106 |
| 65 | N-(2-propionyl-phenoxyethyl)-N,N-dimethyl-N-decyl ammonium bromide. | 103–104 |
| 66 | N-(2-butyryl-phenoxyethyl)-N,N-dimethyl-N-decyl ammonium bromide. | 109–110 |
| 67 | N-(4-propionyl-phenoxyethyl)-N,N-dimethyl-N-dodecyl ammonium bromide. | 88–89 |
| 68 | N-(4-butyryl-phenoxyethyl)-N,N-diemthyl-N-decyl ammonium bromide. | 100–103 |
| 69 | N-(2-butoxycarbonyl-phenoxytehyl)-N,N-dimethyl-N-dodecyl ammonium bromide. | 87–89 |
| 70 | N-(2-carboxy-4,6-dichlorophenoxyethyl)-N,N-dimethyl-N-dodecyl ammonium bromide. | 111–114 |
| 71 | N-(2-methoxycarbonyl-4,6-dichlorophenoxyethyl)-N,N-dimethyl-N-dodecyl ammonium bromide. | Oil |
| 72 | N-[2-(di-acetoxy-methyl)-4-chlorophenoxyethyl]-N,N-dimethyl-N-dodecyl ammonium bromide. | |
| 73 | N-(4-hydroxymethyl-phenoxyethyl)-N,N-dimethyl-N-dodecyl ammonium bromide. | 30 |
| 74 | N-(2-methoxy-5-hydroxymethyl-phenoxyethyl)-N,N-dimethyl-N-dodecyl ammonium bromide. | Oil |
| 75 | N-(2-methoxy-5-hydroxymethyl-phenoxyethyl)-N,N-dimethyl-N-octadecyl ammonium bromide. | 70–73 |
| 76 | N-(2-acetoxymethyl-phenoxyethyl)-N,N-dimethyl-N-dodecyl ammonium bromide. | 94–95 |
| 77 | N-(4-acetoxymethyl-phenoxyethyl)-N,N-dimethyl-N-dodecyl ammonium bromide. | |
| 78 | N-(2-acetyl-1-naphthoxy-ethyl)-N,N-dimethyl-N-decyl ammonium iodide. | 105–108 |
| 79 | N-(1-formyl-2-naphthoxy-ethyl)-N,N-dimethyl-N-dodecyl ammonium bromide. | 129–130 |
| 80 | Bis-2,5[β-(dimethyl-dodecyl-ammonio)-ethoxy]-benzaldehyde dibromide. | 85–89 |
| 81 | N-(2-acetyl-4,6-dichloro-phenoxyethyl)-N,N-dimethyl N-octyl ammonium bromide. | 62–65 |
| 82 | N-[2-(α-hydroxyethyl)-4,6-dibromo-phenoxyethyl]-N,N-diethyl-N-tetradecyl ammonium hydrosulphate. | Oil |
| 83 | N-[2-(α-hydroxy-n-butyl)-4-chloro-phenoxypropyl]-N,N-dimethyl-N-dodecyl ammonium dihydrophosphate. | Oil |
| 84 | N-[2-(α-propionoxymethyl)-5-methoxy-phenoxyethy.]-N,N-diethyl-N-dodecyl-ammonium nitrate. | Oil |
| 85 | N-[4-α-isovaleroyloxymethyl)-2-methoxy-phenoxypropyl]-N,N-dibutyl-N-dodecyl ammonium bromide. | Oil |
| 86 | N-(2-formyl-4-chloro-6-allyloxy-phenyoxethyl)-N,N-dimethyl-N-dodecyl ammonium bromide. | 72–74 |
| 87 | N-(2-formyl-4-chloro-6-allylthio-phenoxyethyl)-N,N-dipropyl-N-dodecyl ammonium bromide. | 80–83 |
| 88 | N-(2-formyl-6-vinyl-phenoxyeth,1)-N,N-dimethyl-N-dodecyl ammonium bromide. | |
| 89 | N-(2-formyl-4,6-dichloro-phenoxy-n-hexyl)-N,N-diethyl-N-undecyl ammonium bromide. | Waxy |
| 90 | N-[γ-(2-formyl-4,6-dichloro-phenoxy)-n-butyl]-N,N,dimethyl-N-dodecyl ammonium bromide. | |

For use in plant protection, the new active substances are made up in the usual way with distributing agents and/or carriers and so applied that the concentration of active ingredient is within the range of 0.01 to 2% by weight calculated on the total weight of the composition to be applied.

The fungicidal agents according to the invention are produced by intimately mixing and milling the active substances of General Formula I with suitable carriers, optionally with the addition of dispersing agents or solvents which are inert to the active substances. The new active substances can be used in plant protection, e.g. in the form of solid preparations such as: dust, sprinkling agents, granulates such as coated granules, impregnated granules, homogeneous granules; in the form of water dispersible concentrates of active substances such as: wettable powders, pastes, emulsions or in the form of liquid preparation such as: solutions, aerosols.

To produce the solid preparations (dust, sprinkling agents, granulates), the active substances are mixed with carriers. Examples of carriers are kaolin, talcum, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphate, magnesium oxide, milled synthetic plastics, fertilizers such as ammonium sulphate, ammonium phosphate, ammonium nitrate, urea, ground vegetable products such as bran, bark dust, sawdust, ground nutshells, cellulose powder, resides of plant extractions, active charcoal etc. These carriers can be used alone or admixed with each other.

The particle size of the carriers is, for dusts advantageously up to about 100μ, for sprinkling agents from about 75μ–0.2 mm. and for granulates from 0.2 mm. or coarser.

As a general rule, the concentrations of active substances in the soild preparations is from 0.5–80% of their total weight.

To these mixtures can also be added additives which stabilize the active substance and/or non-ionogenic, anionically and cationically active substances which, for example, improve the adhesion of the active substances on plants and parts thereof (glues and adhesives) and/or attain better wettability (wetting agents) and dispersibility (dispersing agents) of the active substances. Examples of adhesives are as follows: olein/chalk mixture, cellulose derivatives (methyl celluloses, carboxymethyl celluloses, hydroxyethyl celluloses). The following substances, for example, can serve as wetting and dispersing agents: polyethylene glycol ethers of mono- and di-alkyl phenols having 5–15 ethylene oxide radicals per molecule and 8–9 carbon atoms in the alkyl radical, lignin sulphonic acids, their alkali and alkaline earth metal salts, polyethylene glycol ethers (Carbowaxes), fatty alcohol polyethylene glycol ethers having 5 to 20 ethylene oxide radicals per molecule and 8–18 carbon atoms in fatty alcohol part, condensation products of ethylene oxide/propylene oxide, polyvinyl pyrrolidones, polyvinyl alcohols, condensation products of urea/formaldehyde and also latex products.

The concentrates of active substance which can be dispersed in water, i.e. wettable powders, pastes and emulsion concentrates, are agents which can be diluted with water to any concentration desired. They consist of active substance, carrier, optionally additives which stabilize the active substances, surface active substances and anti-foam agents and, optionally, solvents. The concentration of active substance in these agents is 5–80% of the weight of the latter.

Wettable powders and pastes are obtained by mixing and milling the active substances with dispersing agents and pulverulent carriers in suitable mixers and milling machines until homogeneity is attained. Carriers are, for example, those mentioned in the paragraph dealing with solid forms for application. In some cases it is advantageous to use mixtures of different carriers. Examples of dispersing agents which can be used are: condensation products of sulphonated naphthalene and sulphonated naphthalene derivatives with formaldehyde, condensation products of naphthalene or naphthalene sulphonic acids with phenol and formaldehyde, also alkali, ammonium and alkaline earth metal salts of lignin sulphonic acid, also alkylaryl sulphonates, alkali and alkaline earth metal salts of dibutyl naphthalene sulphonic acid, fatty alcohol sulphates such as salts of sulphated hexadecanols, heptadecanols, octadecanols, octadecenols and salts of sulphated fatty alcohol polyglycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Examples of anti-foam agents are silicones, "Antifoam A" etc. The active substances are so mixed, milled, sieved and strained with the additives mentioned above that, in wettable powders, the solid particle size of 20–40μ, in pastes of 3μ, is not exceeded. To produce emulsion concentrates and pastes, dispersing agents such as those given in the previous paragraphs, organic solvents and water are used. Examples of solvents are as follows: alcohols, benzene, xylenes, toluene, dimethyl sulphoxide, and mineral oil fractions boiling between 120 and 350° C. The solvents must be almost without smell, not phytotoxic, inert to the active substances and not easily inflammable.

In addition, the agents according to the invention can be applied in the form of solutions. For this purpose the active substance or several active substances of General Formula I are dissolved in suitable organic solvents, mixtures of solvents or in water. Aliphatic and aromatic hydrocarbons, chlorinated derivatives thereof, alkyl naphthalenes alone or mixed with each other can be used as organic solvents. The solutions should contain the active substances in a concentration from 1 to 20% of the total weight of the solutions.

The agents according to the invention described can be mixed with other biocidally active compounds or agents. Thus, to broaden the range of action, the new agents can contain, e.g., insecticides, other fungicides, bactericides, fungistatics, bacteriostatics or nematicides in addition to the compounds mentioned of General Formula I. The agents according to the invention can also contain fertilizers, trace elements etc.

The following forms for application of the agents according to the invention serve to illustrate the useful purpose of the present invention. Where not otherwise expressly stated, parts and percentages are given by weight.

Dust

The following components are used to produce (a) a 10% and (b) a 2% dust:

(a)

10 parts of N-(2-formyl-4,6-dichlorophenoxyethyl)-N,N-dimethyl-N-decyl ammonium bromide
5 parts of highly dispersed silicic acid
85 parts of talcum (b)

2 parts of N-(2-formyl-4,6-dichlorophenoxyethyl)-N,N-dimethyl-N-octyl ammonium bromide
1 part of highly dispersed silicic acid
97 parts of talcum.

The above active substances are intimately mixed and milled with the carrier. The fungicidal dusts so obtained serve for the treatment of earth in seed beds or for dusting plants.

Seed dressing

To produce (a) a 10% and (b) a 60% seed dressing, (a)

10 parts of N-(2-formyl-4-dichlorophenoxyethyl)-N,N-dimethyl-N-dodecyl ammonium bromide,
5 parts of kieselguhr
1 part of liquid paraffin
84 parts of talcum (b)

60 parts of N-(2-formyl-4-bromophenoxyethyl)-N,N-dimethyl-N-dodecyl ammonium bromide
15 parts of kieselguhr
1 part of paraffin (liquid)
24 parts of talcum are used.

The active substances mentioned are intimately mixed in a mixer with the carriers mentioned and with the paraffin as distributing agent and the mixture is then milled. The pulverulent seed dressings obtained serve for the treatment of all kinds of seeds.

Granulates

The following components are used to produce (a) a 2.5% and (b) a 5% granulate:

(a)

2.5 parts of N-(2-formyl-4-methylphenoxyethyl)-N,N-dimethyl-N-dodecyl ammonium bromide
2.5 parts of kieselguhr
5 parts of polyethylene glycol
89.3 parts of ground limestone (0.4–0.8 mm. diameter)
0.7 part of silicic acid (b)

5 parts of N-(2-formyl-4-methylphenoxyethyl)-N,N-dimethyl-N-octadecyl ammonium bromide
1.5 parts of kieselguhr
0.5 part of cetyl polyglycol ether
87 parts of ground limestone
5 parts of polyethylene glycol
1 part of silicic acid.

The ground limestone is impregnated with the polyethylene glycol or with the cetyl polyglycol ether and then mixed with a mixture consisting of the active substance given, the silicic acid and the kieselguhr. These granulates are particularly suitable for the disinfection of seed bed earth.

Wettable powder

The following components are used to produce (a) a 10%, (b) a 50% and (c) a 25% wettable powder:

(a)

10 parts of N-(2-formyl-4,6-dichlorophenoxyethyl)-N,N-dimethyl-N-dodecyl ammonium bromide
10 parts of sodium lignin sulphonate
2 parts of a finely milled mixture of kaolin and polyvinyl alcohol 1:1
10 parts of kieselguhr
38 parts of kaolin
30 parts of Champagne chalk.

(b)

50 parts of N-(2-formyl-4-nitrophenoxyethyl)-N,N-dimethyl-N-dodecyl ammonium bromide
20 parts of kieselguhr
5 parts of a mixture of emulsifying agents consisting of 2.5 parts of alkylbutine diol and 2.5 parts of an ethylenediamine-propylene oxide-ethylene oxide condensation product
25 parts of kaolin.

(c)

25 parts of N-(4-formyl-6-methoxyphenoxyethyl)-N,N-dimethyl-N-dodecyl ammonium bromide
50 parts of kieselguhr
22 parts of kaolin
3 parts of a mixture of emulsifying agents consisting of 1.5 parts of alkyl butine diol and 1.5 parts of an ethylenediamine-propylene oxide-ethylene oxide condensation product.

The active substances mentioned are mixed and finely milled with the carriers and distributing agents. Wettable powders of excellent wettability and suspendability are obtained. On diluting such wettable powders with water, suspension of any concentration of active ingredient desired are obtained which serve to treat cultivated plants.

Emulsion concentrate

The following components are used to produce a 25% emulsion concentrate:

25 parts of N-(2-formyl-4,6-dichlorophenoxyethyl)-N,N-dimethyl-N-dodecyl ammonium bromide
50 parts of xylene
20 parts of ethoxyethanol
5 parts of a mixture of emulsifying agents consisting of the Ca salt of dodecylbenzene sulphonic acid and an alkylaryl polyglycol ether (e.g. "Emullat P 140 HFP," produced by Union Chimique Belge, S.A., Brussels).

The active substance is dissolved in xylene/ethoxyethanol and the mixture of emulsifying agents is then added to this solution. An emulsion concentrate is obtained which can be diluted with water to form emulsions of any concentration desired. Such emulsions are suitable for the treatment of cultivated plants.

We claim:
1. A compound of the formula

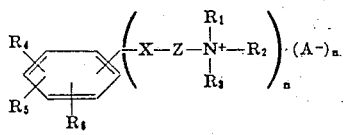

wherein
$R_1$ represents alkyl of from 8 to 18 carbon atoms;
each of $R_2$ and $R_3$ represents alkyl of from 1 to 5 carbon atoms;
$R_4$ represents alkanoyl of from 1 to 5 carbon atoms, carboxy, alkoxycarbonyl in which the alkoxy moiety has from 1 to 5 carbon atoms, α-hydroxyalkyl having from 1 to 5 carbon atoms, or alkanoyloxymethyl in which the alkanoyloxy moiety has from 2 to 5 carbon atoms;
$R_5$ represents hydrogen, chlorine, or bromine;
$R_6$ represents hydrogen, chlorine, bromine, nitro, cyano, amino, alkyl of from 1 to 5 carbon atoms, alkoxy of from 1 to 5 carbon atoms, alkylthio of from 1 to 5 carbon atoms, alkylamino of from 1 to 5 carbon atoms, dialkylamino in which each alkyl has from 1 to 5 carbon atoms, alkenyl of from 2 to 4 carbon atoms, alkenyloxy having 3 or 4 carbon atoms, or alkenylthio having 3 or 4 carbon atoms;
X represents oxygen or sulphur;
Z represents alkylene of from 2 to 6 carbon atoms;
A represents the anion of a non-phytotoxic organic or inorganic acid; and
$n$ represents the number 1 or 2.

2. A compound of the formula

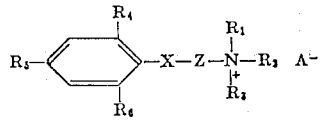

wherein
$R_1$ represents alkyl of from 8 to 18 carbon atoms;
each of $R_2$ and $R_3$ represents alkyl of from 1 to 5 carbon atoms;
$R_4$ represents alkanoyl of from 1 to 5 carbon atoms;
each of $R_5$ and $R_6$ represents chlorine or bromine;
X represents oxygen or sulphur;
Z represents alkylene of from 2 to 6 carbon atoms; and
A represents the anion of a non-phytotoxic organic or inorganic acid.

3. A compound as defined in claim 1, wherein $R_4$ represents alkanoyl.

4. A compound as defined in claim 1, wherein $R_4$ is in o-position to the bridging member X.

5. A compound as defined in claim 4, wherein $R_4$ is formyl.

6. A compound as defined in claim 1, wherein $R_4$ represents a formyl group in o-position to the bridging member X and each of $R_5$ and $R_6$ represents chlorine or bromine.

7. A compound as defined in claim 2, which is N-(2-formyl-4,6-dichloro-phenoxyethyl)-N,N-dimethyl-N-decyl ammonium bromide.

8. A compound as defined in claim 2, which is N-(2-formyl-4,6-dichloro-phenoxyethyl)-N,N-dimethyl-N-dodecyl ammonium bromide.

9. A compound as defined in claim 2, which is N-(2-formyl-4-chloro-6-bromo-phenoxyethyl)-N,N-dimethyl-N-dodecyl ammonium bromide.

10. A compound as defined in claim 2, which is N-(2-formyl-4,6-dichloro-phenoxypropyl)-N,N-dimethyl-N-dodecyl ammonium bromide hydrate.

11. A compound as defined in claim 1, which is N-(2-bromo-4-formyl-6-methoxy-phenoxyethyl)-N,N-dimethyl-N-dodecyl ammonium bromide.

References Cited

FOREIGN PATENTS 905,903  9/1962  Great Britain _____ 260—567.6

OTHER REFERENCES

Cossey et al.: J. Chem. Soc. (London) September 1963, 4322–4330.

Bielstein: Bielstein, Handbuch der Organischen Chemie, vol. 6, pp. 640–641, Springer-Verlac 1965.

Bielstein: Bielstein, Handbuch der Organischen Chemie, vol. 6, pp. 711–712, Springer-Verlac 1965.

LEON ZITVER, Primary Examiner

G. A. SCHWARTZ, Assistant Examiner

U.S. Cl. X.R.

260—465 D, 465 E, 470, 471 R, 490, 501.15, 516, 519, 482 R, 340.9; 424—308, 309, 310, 311, 316, 317, 340.9, 278

UNITED STATES PATENT OFFICE
CERTIFICATE OF CORRECTION

Patent No. 3,801,641                     Dated April 2, 1974

Inventor(s) Pierre H. Payot and Karl Gätzi

It is certified that error appears in the above-identified patent and that said Letters Patent are hereby corrected as shown below:

In the heading, insert:

Claims priority, application Switzerland, May 31, 1966

7852/66

Signed and sealed this 30th day of July 1974.

(SEAL)
Attest:

McCOY M. GIBSON, JR.                    C. MARSHALL DANN
Attesting Officer                       Commissioner of Patents